(12) United States Patent
Kim (10) Patent No.: US 12,519,190 B2
(45) Date of Patent: Jan. 6, 2026

(54) ACTIVE, DYNAMIC, AND REVERSIBLE SHAPE MEMORY ALLOY FILM THERMO-MECHANICAL SAFETY SWITCHES

(71) Applicant: Taesung Kim, Lake Forest, IL (US)

(72) Inventor: Taesung Kim, Lake Forest, IL (US)

( * ) Notice: Subject to any disclaimer, the term of this patent is extended or adjusted under 35 U.S.C. 154(b) by 0 days.

(21) Appl. No.: 18/638,524

(22) Filed: Apr. 17, 2024

(65) Prior Publication Data

US 2025/0329897 A1    Oct. 23, 2025

(51) Int. Cl.
*H01M 50/581* (2021.01)
*H01H 1/00* (2006.01)
(Continued)

(52) U.S. Cl.
CPC ........ *H01M 50/581* (2021.01); *H01H 1/0036* (2013.01); *H01H 37/323* (2013.01);
(Continued)

(58) Field of Classification Search
CPC .... H01M 50/581; H01M 2200/10–108; H01H 37/323; H01H 61/0107; H01H 71/145; H01H 2085/0004; H01H 2209/036; H01H 2209/058; H01H 2209/08; H01H 2061/0115–0122; H05K 2201/0308
See application file for complete search history.

(56) References Cited

U.S. PATENT DOCUMENTS

| | | | | |
|---|---|---|---|---|
| 5,825,275 | A | * | 10/1998 | Wuttig .................. H01H 1/0036 337/140 |
| 6,005,469 | A | * | 12/1999 | Kalapodis ............ H01H 37/323 337/140 |

(Continued)

FOREIGN PATENT DOCUMENTS

| | | |
|---|---|---|
| DE | 102022119479 A1 * | 2/2024 |
| KR | 20180091446 A | 8/2018 |
| KR | 102561195 B1 | 7/2023 |

OTHER PUBLICATIONS

Kim, "Martensitic Transformation in NiTi/Si Composites," Ph.D Dissertation, University of Maryland at College Park Department of Materials and Nuclear Engineering, Materials Engineering, Oct. 20, 1994, 131 pages.

*Primary Examiner* — Robert S Carrico
(74) *Attorney, Agent, or Firm* — Foley & Lardner LLP (57) ABSTRACT

A battery system includes a first electrical interface and safety switch connected to the first electrical interface and including a shape memory alloy element configured to deform from an unactuated configuration to an actuated configuration in response to reaching an activation temperature. A second electrical interface is connected to the safety switch, and the connection between the first electrical interface, the safety switch, and the second electrical interface enables electrical current to flow through a LIB cell. When the shape memory alloy element is the unactuated configuration, the safety switch directly engages the first electrical interface and the second electrical interface and enables electrical current to flow through the LIB cell. When in the actuated configuration, the safety switch disconnects from at least one of the first electrical interface and the second electrical interface and disables electrical current from flowing through the LIB cell.

20 Claims, 9 Drawing Sheets

(51) Int. Cl.
  *H01H 37/32* (2006.01)
  *H01H 61/01* (2006.01)
  *H01H 71/14* (2006.01)
  *H01M 10/0525* (2010.01)

(52) U.S. Cl.
  CPC ...... *H01H 61/0107* (2013.01); *H01H 71/145* (2013.01); *H01M 10/0525* (2013.01); *H01M 2200/10* (2013.01); *H05K 2201/0308* (2013.01)

(56) References Cited

U.S. PATENT DOCUMENTS 6,570,749 B1 * 5/2003 Ling .................... H01H 37/323
  337/140
9,203,069 B2   12/2015 Lee

* cited by examiner

ACTIVE, DYNAMIC, AND REVERSIBLE SHAPE MEMORY ALLOY FILM THERMO-MECHANICAL SAFETY SWITCHES

FIELD OF INVENTION

Embodiments described herein are related to the field of smart materials and devices used for batteries.

BACKGROUND OF THE INVENTION

Lithium-ion batteries (LIBs) are increasingly popular solutions for a variety of energy storage applications. LIBs offer improvements in energy density, lifespan, and environmental impact compared to prior battery solutions and are used to power portable electronics, electric vehicles (EVs), large-scale renewable energy projects, and more. The LIB industry is growing and expected to grow even more quickly as consumers, industries, and nations continue to transition to electrically powered systems.

However, improper use or handling of LIBs may lead to the occurrence of a dangerous phenomenon called "thermal runaway." Thermal runaway may occur when exothermic chain reactions take place within the LIB, which may cause a rapid increase in battery temperature (e.g., overcurrent/short circuit) and destabilization of the internal structures of the LIB. As a result, excess heat may be generated within the LIB, which may further intensify the exothermic chain reactions and cause large amounts of flammable gases to be released. As the internal pressure of the LIB continues to rise in response, an outer casing of the LIB may expand until the LIB eventually explodes and/or catches fire. In many cases, thermal runaway events related to LIBs cause property damage, injury to persons, or death.

While the risk of thermal runaway for a single LIB cell is low, the probability of thermal runaway increases significantly when multiple LIB cells are combined in a single system. Further, because thermal runaway is a chain reaction and takes place internally within LIB cells, it may be difficult or impossible to prevent a resulting explosion or fire once the thermal runaway process has begun. In large installations with hundreds or thousands of cells, such as an EV battery pack or large-scale lithium-ion battery energy storage system (e.g., LIB ESS), for example, a change in one cell (e.g., a temperature increase) may cause a change in a neighboring cell (e.g., initiating or accelerating thermal runaway), which often leads to uncontrollable, self-sustaining reactions. Thus, a failure (e.g., due to thermal runaway) of a single LIB cell may cause catastrophic failure of an entire LIB module (e.g., a battery back implementing the LIB cell) and/or failure of the entire system implementing the LIB cell.

To prevent thermal runaway in LIBs, current solutions may include implementing a more robust battery box to contain reactions and/or prevent damage to neighboring cells, implementing a more efficient cooling system to prevent thermal runaway, or including flame-retardant additives within the LIB to improve the battery's thermal stability and prevent ignition. However, these solutions are typically permanent (e.g., irreversible) or passive (e.g., not configured to activate in response to a specific thermal runaway event, etc.) and may be limited in effectiveness at preventing thermal runaway. As such, users or designers of LIBs may desire a solution to prevent or mitigate the effects of thermal runaway that is active/dynamic, reversible, and effective.

SUMMARY OF THE INVENTION

Some embodiments relate to a battery system including a first electrical interface and safety switch connected to the first electrical interface and including a shape memory alloy element configured to deform from an unactuated configuration to an actuated configuration in response to reaching an activation temperature. A second electrical interface is connected to the safety switch, and the connection between the first electrical interface, the safety switch, and the second electrical interface enables electrical current to flow through a lithium-ion battery (LIB) cell. When the shape memory alloy element is the unactuated configuration, the safety switch directly engages the first electrical interface and the second electrical interface and enables electrical current to flow through the LIB cell. When the shape memory alloy element is in the actuated configuration, the safety switch disconnects from at least one of the first electrical interface and the second electrical interface and disables electrical current from flowing through the LIB cell.

In some embodiments, the shape memory alloy element is configured to reversibly transition between a first length associated with the unactuated configuration and a second length associated with the unactuated configuration in response to a change in temperature of the LIB cell.

In some embodiments, actuation of the shape memory alloy element causes the shape memory alloy element to physically engage with the safety switch to actuate to the safety switch, wherein the shape memory alloy element of the safety switch actuates reversibly between an "ON" state and an "OFF" state, and the shape memory alloy element allows the flow of electricity in the LIB cell while in the "ON" state and disables the flow of electricity in the LIB cell while in the "OFF" state.

In some embodiments, the shape memory alloy element includes a crystalline shape memory alloy layer and an amorphous shape memory alloy layer.

In some embodiments, a thickness of the crystalline shape memory alloy layer and a thickness of the amorphous shape memory alloy layer are substantially identical.

In some embodiments, the amorphous shape memory alloy layer is an alloy having a composition of 50% Ni and 50% Ti.

In some embodiments, the crystalline shape memory alloy layer includes an alloy of Nickel (Ni) and Titanium (Ti).

In some embodiments, the crystalline shape memory alloy layer is configured to transition from a Martensitic phase in the unactuated configuration to an Austenite phase in the actuated configuration.

In some embodiments, the safety switch further includes a first electrically conductive layer, a silicon single crystal layer, and a second electrically conductive layer.

In some embodiments, the first electrical interface is a positive terminal of the LIB cell and the second electrical interface is a positive tab of the LIB cell, or the first electrical interface is a negative terminal of the LIB cell and the second electrical interface is a negative tab of the LIB cell.

In some embodiments, the first electrical interface is an electrode tab electrically connecting the LIB cell to one or more LIB cells, and the second electrical interface is a positive terminal or a negative terminal of the LIB cell.

Some embodiments relate to shape memory alloy assembly configured to deform from an unactuated configuration to an actuated configuration in response to reaching an activation temperature including a first electrically conductive layer, a crystalline shape memory alloy layer, a silicon single crystal layer, an amorphous shape memory alloy layer, and a second electrically conductive layer.

In some embodiments, the first electrically conductive layer, the crystalline shape memory alloy layer, the silicon single crystal layer, the amorphous shape memory alloy layer, and the second electrically conductive layer are stacked in the order recited in the paragraph above or in a reverse order of the order recited in the paragraph above.

In some embodiments, a first side of the first electrically conductive layer is coupled to a first side of the crystalline shape memory alloy layer, a second side of the crystalline shape memory alloy layer is coupled to a first side of the silicon single crystal layer, a second side of the silicon single crystal layer is coupled to a first side of the amorphous shape memory alloy layer, and a second side of the amorphous shape memory alloy layer is coupled to a first side of the second electrically conductive layer.

In some embodiments, the composition and physical dimensions of the amorphous shape memory alloy layer are selected to reduce stress associated with a phase change of the crystalline shape memory alloy layer.

Some embodiments relate to a safety switch configured to deform from an unactuated configuration to an actuated configuration in response to reaching an activation temperature including a shape memory element. The shape memory element includes a crystalline shape memory alloy layer, a silicon single crystal layer, and an amorphous shape memory alloy layer, In some embodiments, the safety switch further includes a first electrically conductive layer coupled to a first side of the shape memory element and a second electrically conductive layer coupled to a second side of the shape memory element.

In some embodiments, the safety switch further includes a first electrical interface, and the first electrically conductive layer of the safety switch is electrically connected to the first electrical interface. The safety switch further includes a second electrical interface, the second electrically conductive layer of the safety switch is electrically connected to the second electrical interface, and actuation of the shape memory element causes at least one of the first electrical interface or the second electrical interface to disconnect from the safety switch.

In some embodiments, a first temperature of the safety switch is associated with the actuated configuration, the actuated configuration associated with the first temperature is unique to the first temperature, and the safety switch is configured to be in the actuated configuration only when the safety switch is at the first temperature. Further, a second temperature of the safety switch is associated with the unactuated configuration, the unactuated configuration associated with the second temperature is unique to the second temperature, and the safety switch is configured to be in the unactuated configuration only when the safety switch is at the second temperature.

In some embodiments, a first side of the crystalline shape memory alloy layer is coupled to a first side of the silicon single crystal layer, and a second side of the silicon single crystal layer is coupled to a first side of the amorphous shape memory alloy layer.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

It will be recognized that the figures are the schematic representations for purposes of illustration. The figures are provided for the purpose of illustrating one or more implementations with the explicit understanding that the figures will not be used to limit the scope of the meaning of the claims.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Thermal runaway in LIBs causes system failure, physical injuries, and even deaths. While current solutions exist, these solutions are typically permanent (e.g., irreversible), passive (e.g., not configured to activate in response to a specific thermal runaway event, etc.), and may be limited in effectiveness at preventing thermal runaway. For example, a safety switch used in a LIB may include a shape memory alloy (SMA) element configured to deform in response to an increase in temperature, thereby cutting off electrical current flow within the LIB and preventing further damage (e.g., thermal runaway). However, due to the nature of the shape memory alloy, the safety switch may remain in an "OFF" state such that the LIB is non-functional after the safety switch is triggered. In other systems, mechanical/thermal stress (e.g., hysteresis) may cause the safety switch to be irreversible (e.g., unable to transition back to an "ON" state following activation to the "OFF" state, delayed transition back to an "ON" state following activation to the "OFF" state, etc.).

To address these shortcomings, the systems disclosed herein relate to safety features for lithium-ion batteries using shape memory alloy materials. In particular, described herein are systems and methods for active, dynamic, and reversible SMA film thermos-mechanical safety switches. When the SMA material heats to a temperature exceeding a safe operating temperature for the LIB, such as when thermal runaway occurs, the SMA material changes shape to cut off the current in the battery (e.g., transition a safety switch including the shape memory alloy to an "OFF" state). In the embodiments disclosed herein, another shape memory alloy material is included within the safety switch to enable the switch to return to an "ON" state after being triggered to an "OFF" state. In particular, a layer of amorphous shape memory alloy is added to a layer of crystalline shape memory alloy to eliminate hysteresis in the crystalline shape memory alloy when the LIB cools back down. Thus, the switch is reversible (e.g., fully reversible, configured to transition between unique, predefined "ON" and "OFF" states, etc.).

Figure 1A:
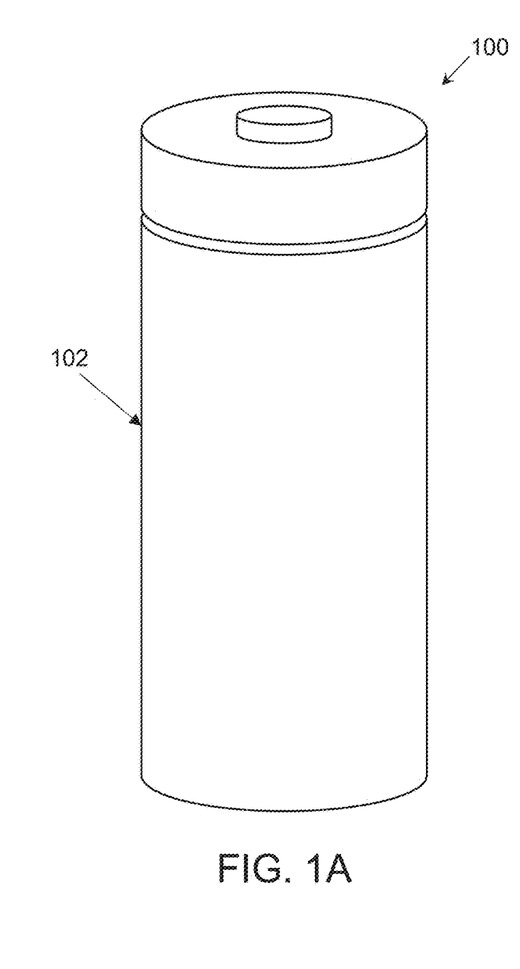
FIGS. 1A, 1B, and 1C illustrate examples of a LIB cell, according to an embodiment.
Figure 1B:
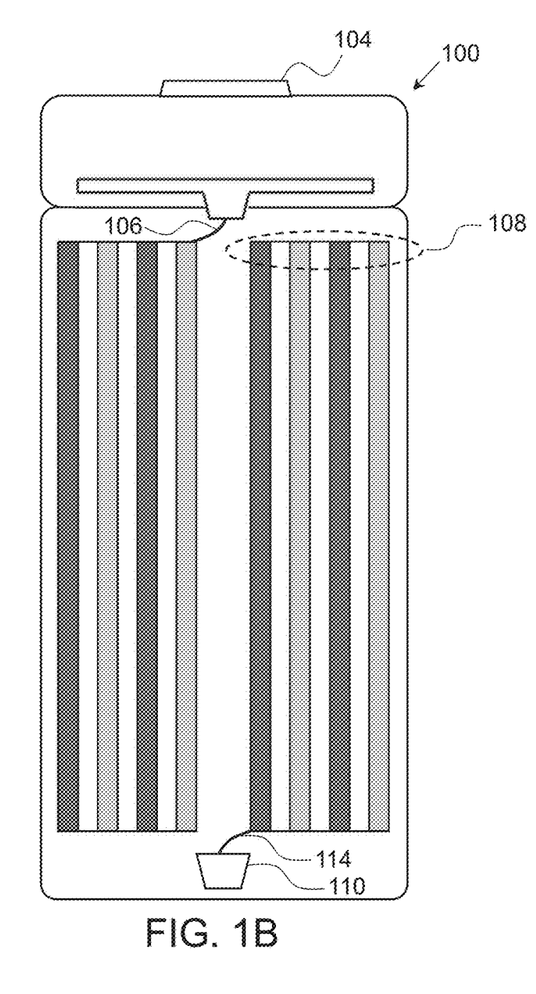
Figure 1C:
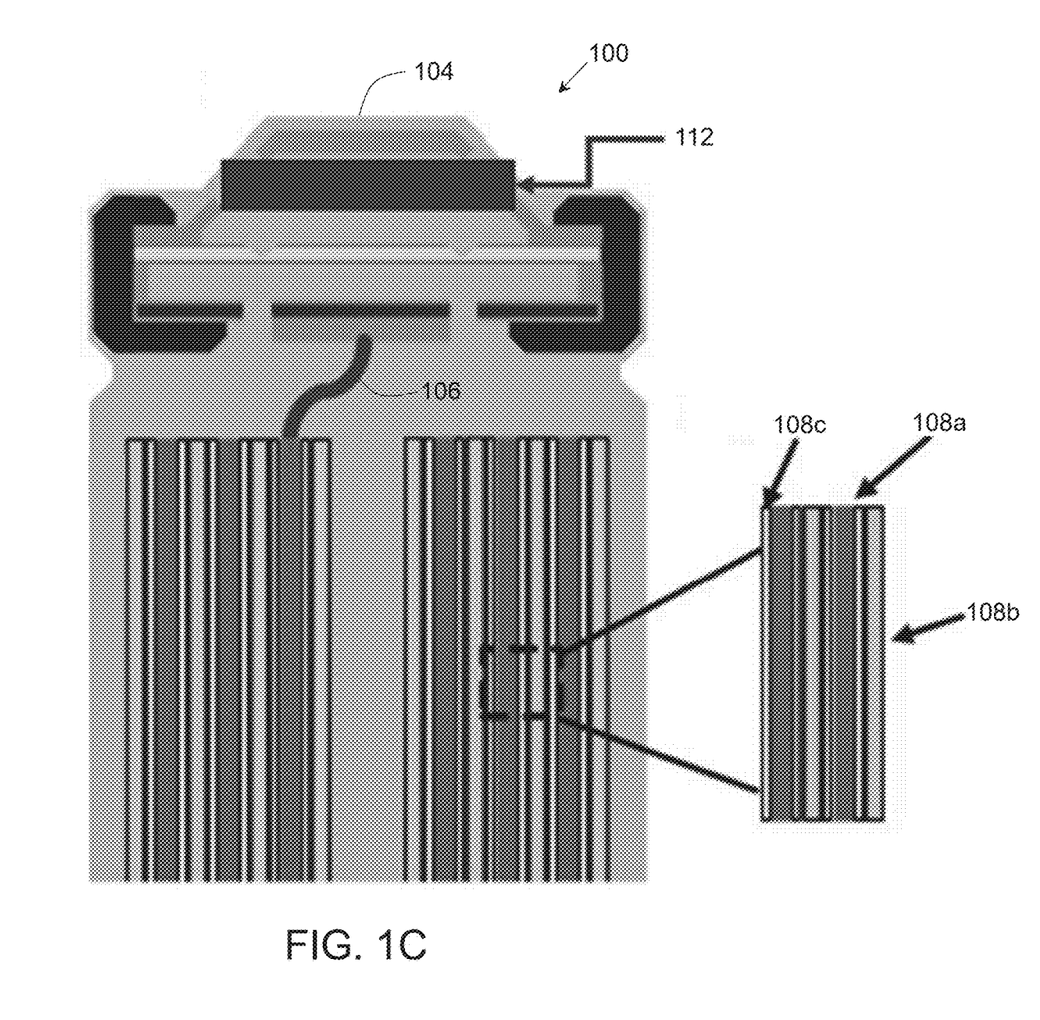

With regard to FIGS. 1A, 1B, and 1C, illustrative examples of a LIB cell 100 are shown, according to an embodiment. In FIG. 1A, the LIB cell 100 may include housing 102 to protect internal elements of the LIB cell 100 and/or contain reactions occurring within the LIB cell 100. The LIB cell 100 may be a type of rechargeable battery that uses the reversible intercalation of Li+ ions into electronically conducting solids to store energy (e.g., a lithium-ion battery). As previously described, certain events (e.g., overheating, overcharging, shock from dropping/crushing, overcurrent, etc.) may cause thermal runaway of the LIB cell 100, which may cause catastrophic failure (e.g., causing LIB cell 100 to be non-functional, damaging a neighboring LIB cell, etc.).

As shown in FIG. 1B, the LIB cell 100 may include one or more current carriers, such as a positive terminal 104, a positive tab 106, internal components 108, and a negative terminal 110. During the discharge of the LIB cell 100 (e.g., when the LIB cell 100 is connected with an electrical load, such as an electrical appliance, electric vehicle, etc.), electrical current may flow from the positive terminal 104 to the negative terminal 110 through the electrical load. Specifically, electrical current generated from the internal components 108 may flow to the positive terminal 104 through the positive tab 106. For example, the internal components 108, positive tab 106, positive terminal 104, and negative terminal 110 can be electrically connected such that a complete circuit is formed between the positive terminal 104 and the negative terminal 110 of the LIB cell 100.

Turning to FIG. 1C, the internal components 108 of the LIB cell 100 may include one or more anode layers 108a, cathode layers 108b, and separator layers 108c. In some embodiments, positive tab 106 connects the cathode layers 108b to the external circuit of the LIB cell 100, and a negative tab 114 connects the anode layers 108a to the external circuit of the LIB cell 100. For example, one or more of the anode layers 108a may be electrically connected to the positive tab 106, and one or more of the cathode layers 108b may be electrically connected to the positive tab 106 to enable electrical current to flow through the LIB cell 100. The LIB cell 100 may further include a safety switch 112, which may be located between and electrically connected to the positive terminal 104 and the positive tab 106. The safety switch 112 may be configured to transition to an "OFF" state in response to an increase in temperature beyond a safe operating range by, for example, physically changing its shape such that electrical current is unable to travel between the positive terminal 104 and the positive tab 106 (e.g., preventing power from entering or exiting the LIB cell 100). For example, in the "OFF" state, the safety switch 112 may disconnect from (e.g., lose physical contact with) one or both of the positive terminal 104 or the positive tab 106. In some embodiments, the safety switch 112 may be located between the negative terminal 110 and a negative tab 114 of the LIB cell 100 and may be configured to disconnect with one or both of the negative terminal 110 and negative tab 114.

Figure 2A:
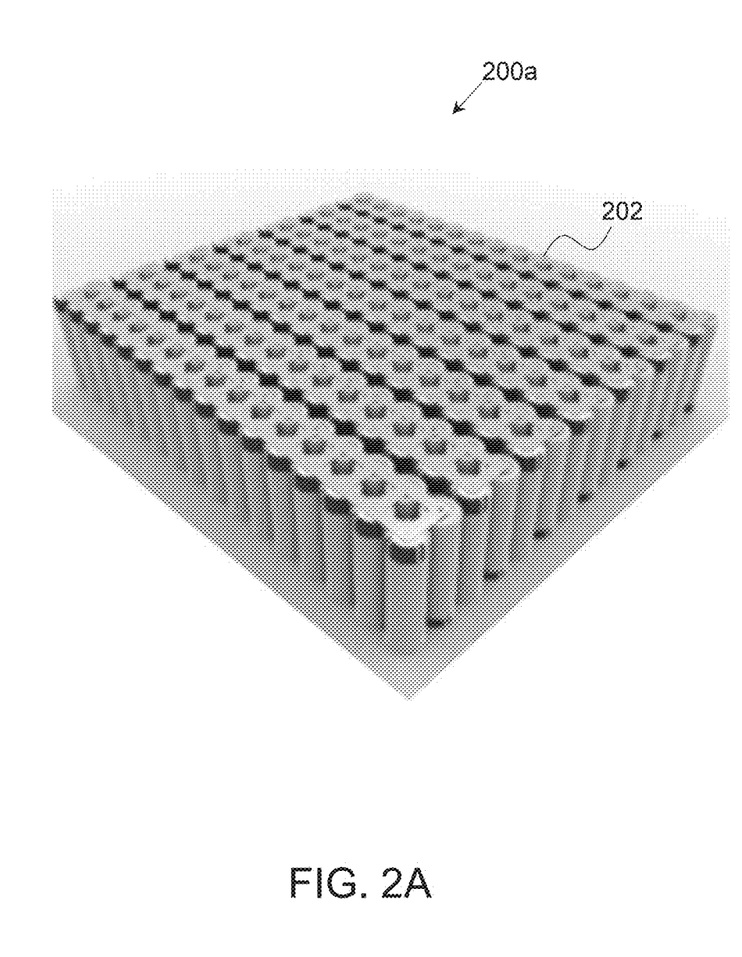
FIGS. 2A, 2B, and 2C illustrate examples of a LIB module and a safety switch, according to an embodiment.
Figure 2B:
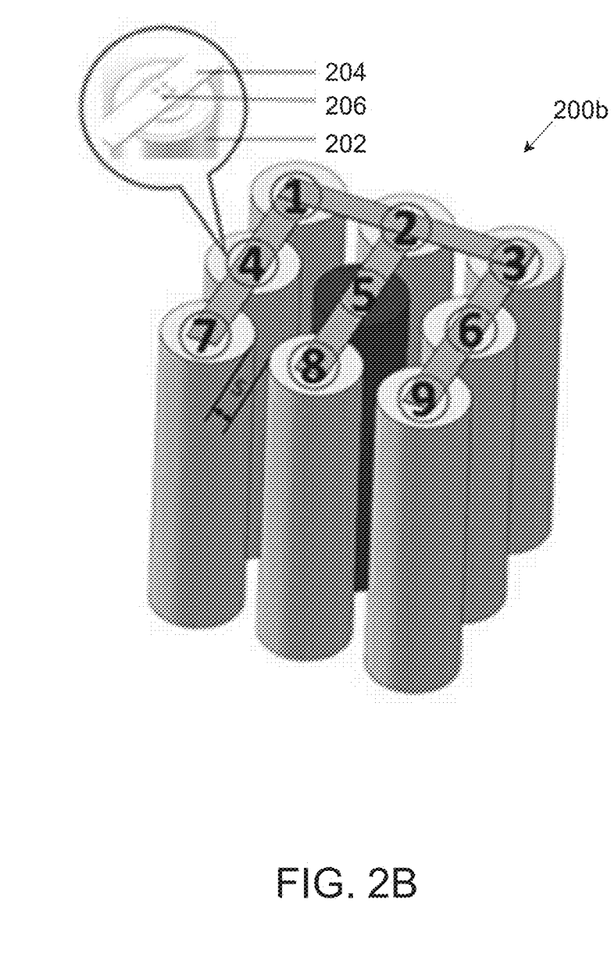
Figure 2C:
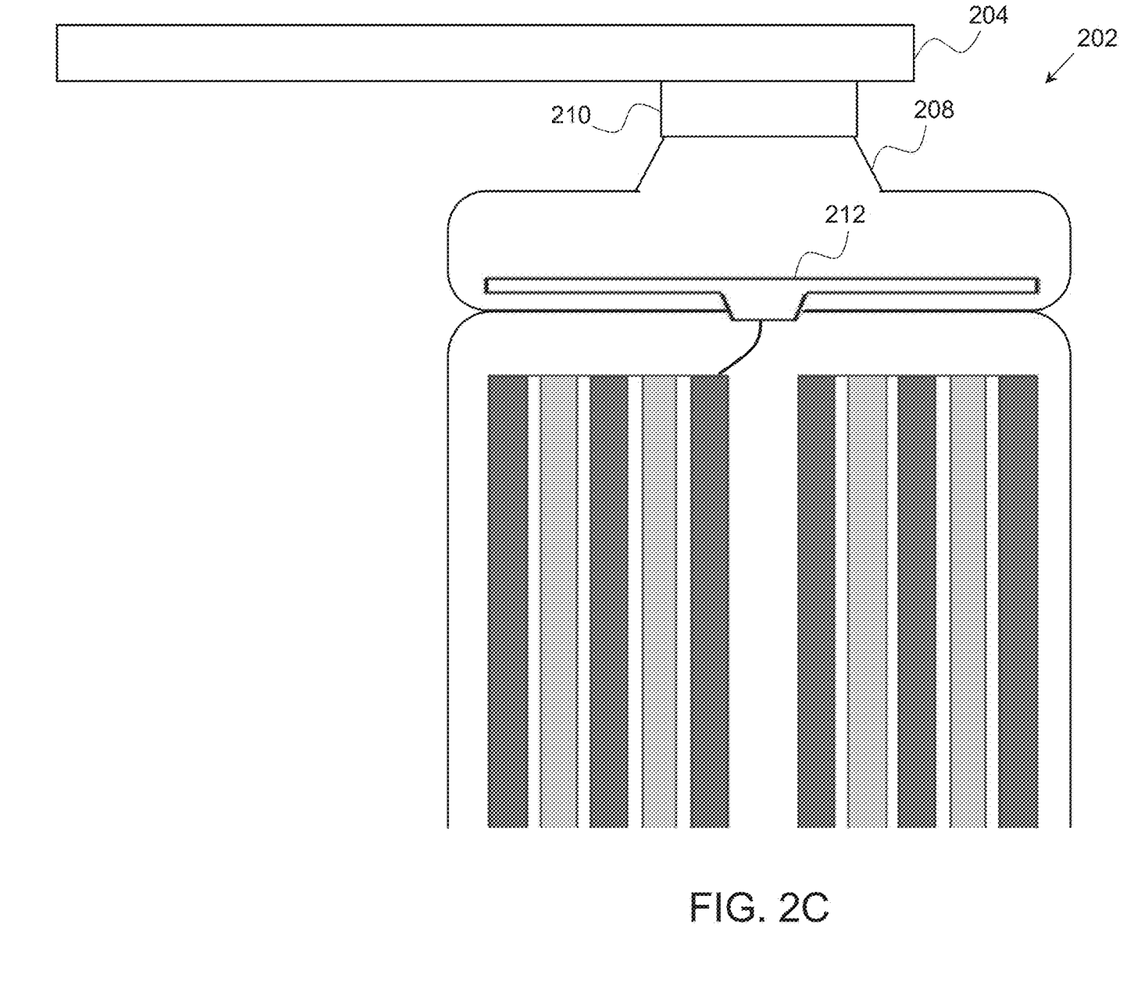

With regard to FIGS. 2A, 2B, and 2C, illustrative examples of a LIB module 200a-200b and a safety switch 210 are shown, according to some embodiments. In FIG. 2A, a LIB module 200a including multiple LIB cells 202 is shown. The LIB cell 202 may be the same or similar to the LIB cell 100 of FIG. 1. As shown in FIG. 2B, each of the LIB cells 202 of the LIB module 200b may be electrically connected (e.g., parallel or series) via an electrode tab 204 such that a complete system is formed including each of the multiple LIB cells 202. For example, a LIB module 200a-200b including multiple LIB cells 202 may be used as a battery pack on an electric vehicle (EV), or otherwise.

As shown in FIG. 2C, each of the LIB cells 202 may include a positive terminal 208, safety switch 210, and a positive tab 212. The safety switch 210 may be positioned between the electrode tab 204 and the positive terminal 208 in some embodiments, and the safety switch 210 may be positioned between the positive terminal 208 and the positive tab 212 in other embodiments. The safety switch 210 may be in an initial "ON" state such that electrical current may flow through the electrode tab 204 into the LIB cell 202 via the positive terminal 208 (e.g., the positive terminal 208 being connected to the positive tab 212 which is then connected an anode layer, as described regarding anode layer(s) 108a of FIG. 1). The safety switch 210 may be configured to transition to an "OFF" state in response to a certain event (e.g., an increase in temperature) by, for example, changing its physical dimensions such that there is no electrical connection between positive terminal 208 and the electrode tab 204 or between the positive terminal 208 and positive tab 212 (e.g., disconnecting power from the LIB cell 202). For example, in an embodiment in which the safety switch 210 is positioned between the electrode tab 204 and the positive terminal 208, the safety switch 210 may deform in response to an increase in temperature such that the safety switch 210 loses physical contact with one or both of the electrode tab 204 or the positive terminal 208, thus breaking the electrical connection between the electrode tab 204 and the positive terminal 208. In an embodiment in which the safety switch 210 is positioned between the positive terminal 208 and the positive tab 212, the safety switch 210 may deform in response to an increase in temperature such that the safety switch 210 loses physical contact with one or both of the positive terminal 208 or positive tab 212, thus breaking the electrical connection between the positive terminal 208 and the positive tab 212. In some embodiments, the safety switch 210 may be positioned on the negative side of the LIB cell 202 (e.g., by the safety switch 210 being located between a negative terminal and a negative tab of the LIB, as described regarding FIG. 1).

With regard to FIGS. 3A, 3B, 3C, and 3D, illustrative implementations of safety switches with multiple shape memory alloy layers used in (i) a LIB module and (ii) a LIB cell are shown, according to an embodiment. As shown, the safety switch 302 may be located between and electrically connected to a first electrical interface 304 and a second electrical interface 306.

Figure 3A:
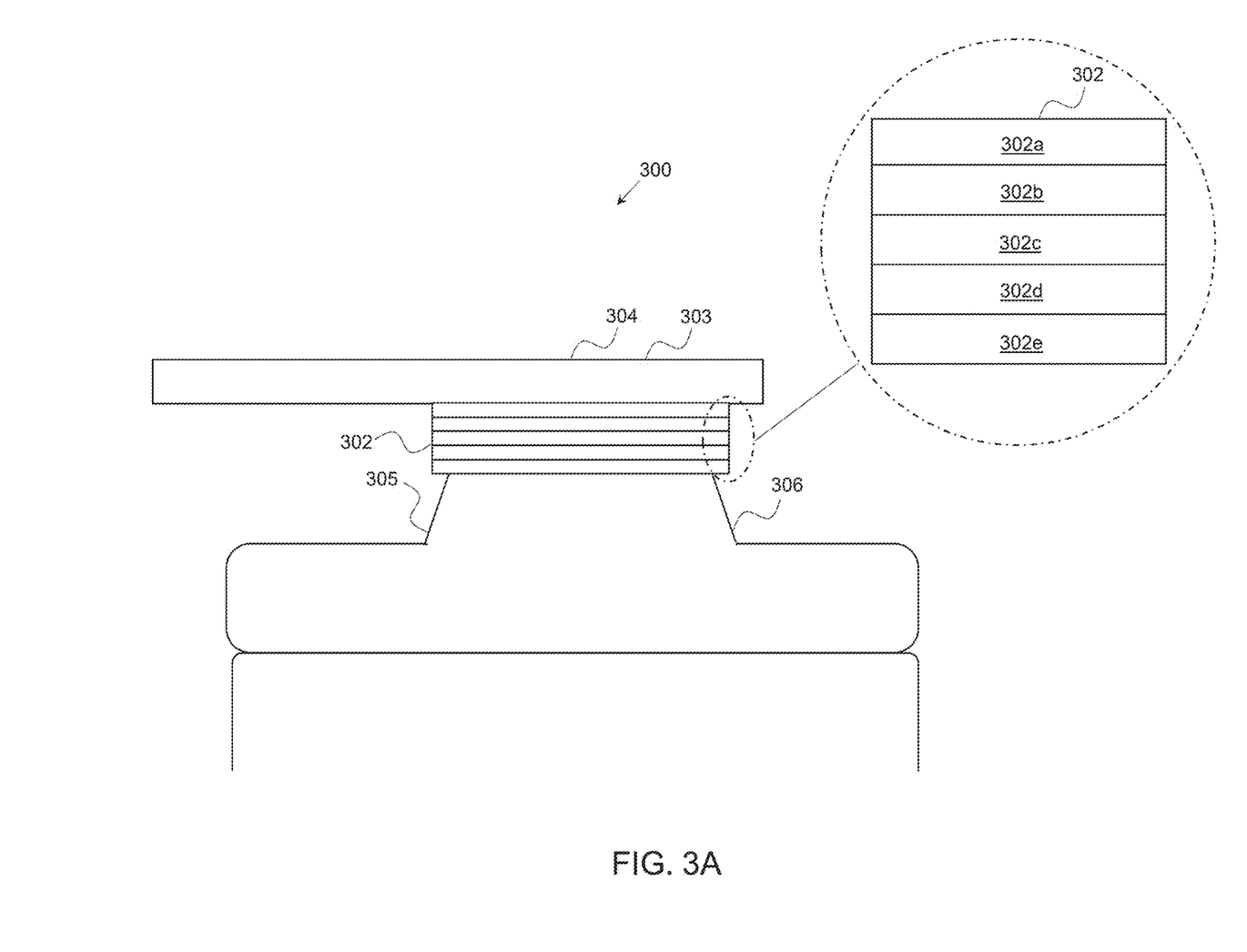
FIGS. 3A and 3B illustrate implementations of safety switches with multiple shape memory alloy layers used in (i) a LIB module and (ii) a LIB cell.

In some embodiments, such as the embodiment illustrated in FIG. 3A, the LIB cell 300 may be one of multiple LIB cells included in a LIB module (e.g., LIB module 200 of FIG. 2). For example, the first electrical interface 304 may be an electrode tab 303 (or electrical connector, etc.) electrically connecting the multiple LIB cells (e.g., in parallel or series), and the second electrical interface 306 may be a positive terminal 305 of the LIB 300. The positive terminal (or second electrical interface 306) may be connected to an anode layer of the LIB cell 300 (e.g., via a positive tab of the LIB 300) and provide power to the LIB cell 300, as described regarding the positive tab 106 and anode layer(s) 108a of FIG. 1. As shown, the safety switch 302 may be located between and electrically connected to the electrode tab 303 (first electrical interface 304) and the positive terminal 305 (second electrical interface 306) of the LIB 300 such that electrical current may flow through the electrode tab 303 to the positive terminal 305 via the safety switch 302.

In some embodiments, the safety switch 302 may be external to the LIB 300 (e.g., implemented outside of a physical housing of the LIB cell 300 between an electrical interface of the LIB 300 and another external electrical interface, as shown in FIG. 3A). In other embodiments, the safety switch 302 may be internal to the LIB (e.g., implemented inside a physical housing between two electrical interfaces of the LIB 300). Further, in an example, the safety switch 302 may be implemented on every LIB 300 of the LIB module, or on individually-selected LIBs 300.

Figure 3B:
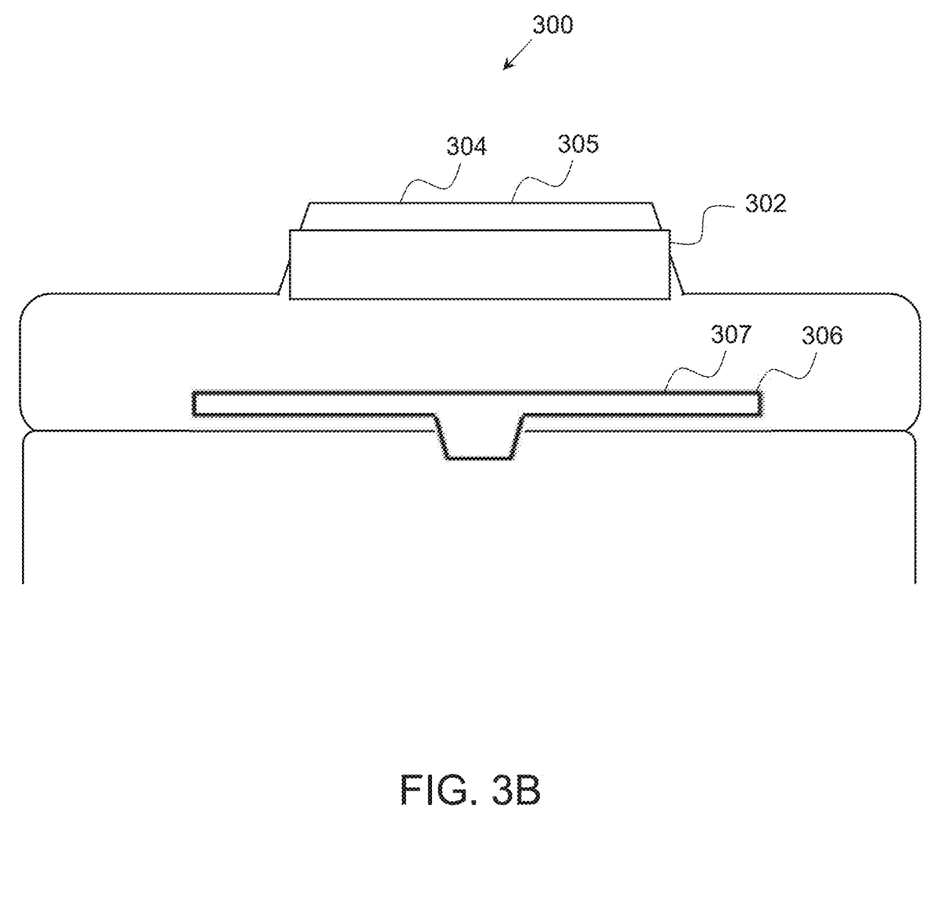

While the safety switch 302 is illustrated as being located between the electrode tab and positive terminal in FIG. 3A, it should be understood that additional and/or alternative configurations and/or arrangements are possible. For example, as shown in FIG. 3B, the first electrical interface 304 may be a positive terminal 305 of the LIB 300, and the second electrical interface 306 may be a positive tab 307 of the LIB 300. The positive tab 307 (or second electrical interface 306) may be connected to an anode layer of the LIB cell 300 and provide power to the LIB cell 300, as described regarding the positive tab 106 and anode layer(s) 108a of FIG. 1. The safety switch 302 may be located between and electrically connected to the positive terminal (first electrical interface 304) and positive tab (second electrical interface 306) (e.g., as shown regarding the safety switch 112 in FIG. 1C). In one example, the safety switch 302 may be implemented such that, when triggered to an "OFF" state, the safety switch 302 may prevent and/or disable electrical current from flowing through the positive terminal to the positive tab via the safety switch 302. In other embodiments, the first electrical interface 304 and/or second electrical interface 306 may be other components of the LIB cell 300 (e.g., a first electrical interface 304 being a negative terminal and a second electrical interface 306 being a negative tab of the LIB cell 300).

Figure 3C:
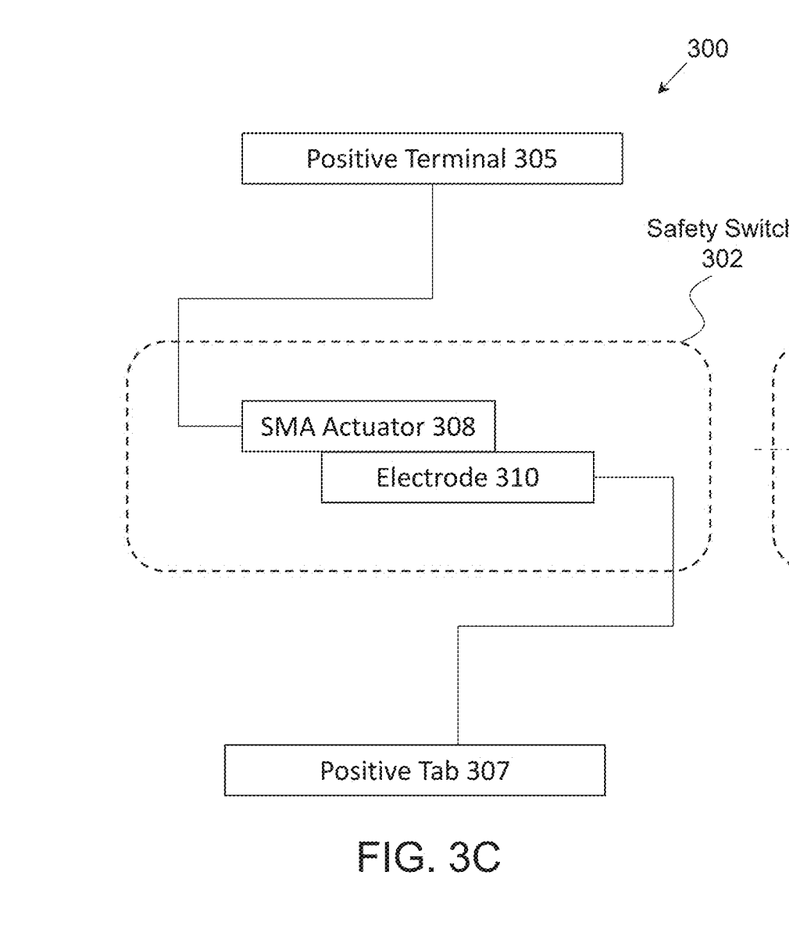
FIG. 3C illustrates a safety switch positioned in an ON state, according to some embodiments.
Figure 3D:
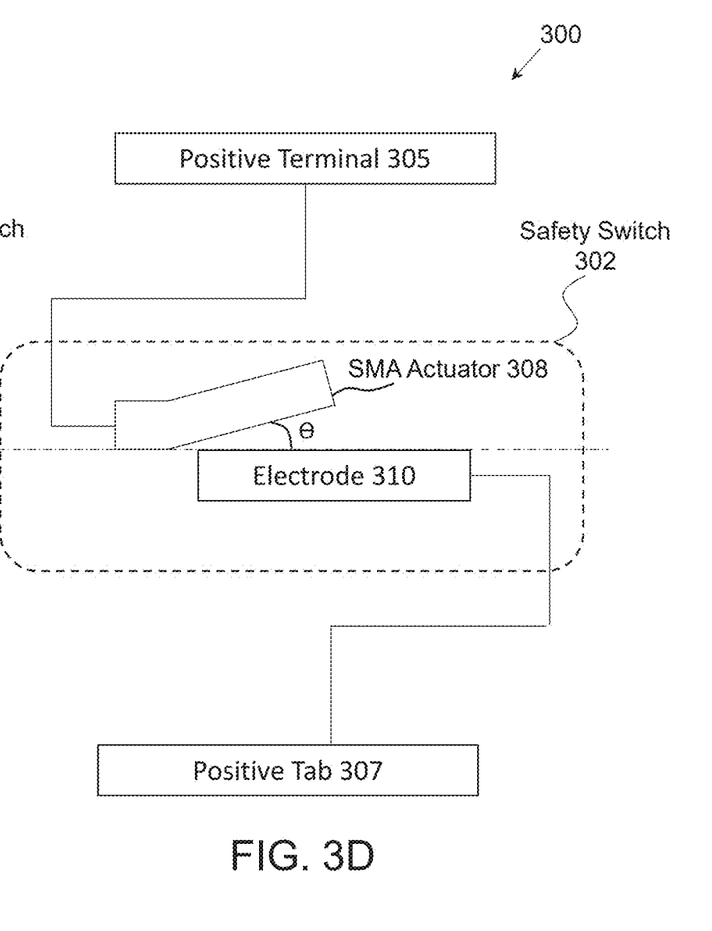
FIG. 3D illustrates the safety switch of #C positioned in an OFF state.

The safety switch 302 (or shape memory alloy assembly, SMA assembly, etc.) may include multiple layers 302a-302e. In some embodiments, the safety switch 302 may include the following layers: a first electrically conductive layer 302a, a crystalline shape memory alloy (SMA) layer 302b, a silicon single crystal layer 302c, an amorphous shape memory alloy (SMA) layer 302d, and a second electrically conductive layer 302e. In some embodiments, (as shown in FIGS. 3C and 3D) the switch 302 may include an SMA actuator 308 comprising the layers 302a-302e and an electrode 310 that is in contact with the SMA actuator 308 in an unactuated configuration and disconnected from the SMA actuator 308 in an actuated configuration. In some embodiments, the layers 302a-302e may be included in the order listed above. For example, the first electrically conductive layer 302a may be coupled (e.g., directly coupled) to a first side of the crystalline SMA layer 302b, a first side of the silicon single crystal layer 302c may be coupled (e.g., directly coupled) to a second side of the crystalline SMA layer 302b, a first side of the amorphous SMA layer 302d may be coupled (e.g., directly coupled) to a second side of the silicon single crystal layer 302c, and a second electrically conductive layer 302e may be coupled (e.g., directly coupled) to a second side of the amorphous SMA layer 302d. Each of the layers 302a-302e may be film layers (e.g., thin-film lithium-ion battery layers) or any material, combination of materials, device, apparatus, or otherwise configured to actuate the safety switch 302 in response to an increase in temperature (e.g., thermal runaway), as further described herein. In some embodiments, the layers 302a-302e can be film layers and be made utilizing various film deposition methods (e.g., sputtering, ion beam sputtering, evaporation deposition, electron beam evaporation, chemical vapor deposition (CVD), plasma CVD, low pressure CVD, physical vapor deposition (PVD), ion plating, pulsed laser deposition, molecular beam epitaxy, atomic layer deposition, electroplating, pyrolysis, dip coating, and/or spin coating, or a combination of various film deposition methods.

In one example, the silicon single crystal layer 302c may be used to bind layers 302a-302b and 302d-302e of the safety switch together. The silicon single crystal layer 302c may be poly-crystalline (or multi-crystalline) substrate or film and includes silicon. In some embodiments, the silicon single crystal layer 302c may include Nitrogen (N), Carbon (C), Germanium (Ge), Zinc (Zn), Selenium (Sc), Gallium (Ga), Arsenic (As), Indium (In), Phosphorus (P), and/or any combination of the elements listed (e.g., SIN, SiC, SiGe, ZnSe, GaN, GaAs, InP, InGaAlP, etc.). Further, the silicon single crystal layer 302c may include sapphire, diamond, and/or any combination of the materials listed including one or more of sapphire, diamond, and silicon.

The first electrically conductive layer 302a and second electrically conductive layer 302e may be electrically conductive film layers or any other material, device, or apparatus configured to enable the flow of electrical current in the LIB cell 300. For example, the first electrically conductive layer 302a and/or second electrically conductive layer 302b may include Gold (Au), Silver (Ag), Aluminum (Al), Copper (Cu), Tin (Sn), Lead (Pb), or any other combination of the elements listed (e.g., an alloy of Sn/Pb).

The crystalline SMA layer 302b and/or amorphous SMA layer 302d may be a material including an alloy of Nickel (Ni) and Titanium (Ti) (e.g., Ni—Ti, Nitinol, other Nickel-Titanium alloys, etc.), or any other material capable of performing the functions further described herein. In some embodiments, the crystalline SMA layer 302b and/or amorphous SMA layer 302d may be a material including an alloy including one or more of Zinc (Zn), Copper (Cu), Gold (Au), Silicon (Si), Manganese (Mn), Aluminum (Al), and Iron (Fe). In other examples, the crystalline SMA layer 302b and/or amorphous SMA layer 302d may include one or more of the following alloys: Fe—Mn—Si, Cu—Zn—Al, and/or Cu—Al—Ni. In some embodiments, the crystalline SMA layer 302b and/or amorphous SMA layer 302d may be an alloy of 50% Ni and 50% Ti. Note that generally, while both crystalline and amorphous SMAs can be made using similar compositions and/or constituent elements, crystalline SMAs are characterized by a highly ordered atomic structure, where atoms are arranged in a repeating pattern forming a crystal lattice. Generally, crystalline SMAs are produced by controlled heating of the SMA above a critical temperature (Tc) of crystallization of the SMA and controlled cooling of the SMA below Tc allowing atoms to organize into a structured arrangement. Distinctly, amorphous SMAs, or "metallic glasses," are formed of similar constituent elements but manufactured without the controlled heating and cooling process to prevent the atoms of amorphous SMAs from organizing into a crystalline structure. This results in a disordered atomic arrangement.

The crystalline SMA layer 302b may be configured to actuate the safety switch 302 in response to a temperature change by, for example, changing the length (e.g., elongating or shortening) of the crystalline SMA layer 302b and/or the safety switch 302 such that electrical current is unable to flow from the first electrical interface 304 to the second electrical interface 306. For example, the crystalline SMA layer 302b may be configured to extend (e.g., elongate, lengthen, actuate) from an initial position corresponding to an "ON" state (e.g., allowing electrical current to flow through the LIB 300 by maintaining a physical/electrical connection between the first electrical interface 304 and the second electrical interface 306) to an "OFF" state (e.g., preventing electrical current flow by disconnecting a physical/electrical connection between the first electrical interface 304 and the second electrical interface 306) in response to an increase in temperature of the crystalline SMA layer 302b above the lower phase transformation ($T_{pl}$), the safety switch 302, and/or any other component of the LIB 300. Accordingly, the crystalline SMA layer 302b may reach a second or final position (e.g., length) associated with the increase in temperature above the higher phase transformation ($T_{ph}$). Further, in response to a decrease in temperature, the crystalline SMA layer 302b may be configured to retract (or shorten) to the initial position/length, or a position substantially equivalent to the initial position/length as determined by comparing the final length to the initial length (e.g., with a recovery defined as 'substantially equivalent' if the overall change in length is within 11% of the baseline or original length, depending on crystallographic direction), thereby transitioning the safety switch 302 back into an "ON" state such that electrical current may flow through the first electrical interface 304, the safety switch 302, and the second electrical interface 306 (e.g., providing power to the LIB 300).

Because the layers 302a-302e may be bound together (e.g., by the silicon single crystal layer 302c), the actuation (e.g., deformation, lengthening, etc.) of one of the layers (e.g., crystalline SMA layer 302b) may actuate the entire safety switch 302. For example, because the crystalline SMA layer 302b is physically coupled with the other layers 302a and 302c-e of the safety switch, actuation of the crystalline SMA layer 302b to a first position (e.g., first length) associated with a first temperature ($T_{pl}$) and to a second position (e.g., second length) associated with a second temperature ($T_{ph}$), respectively, can cause the safety switch 302 to actuate to the first position (e.g., first length) associated with the first temperature and to the second position (e.g., second length) associated with the second temperature. In one embodiment, the crystalline SMA layer 302b may actuate the safety switch 302 by transferring energy associated with a phase change from a Martensitic phase to an Austenite phase to the safety switch 302 and/or layers 302a and 302c-e. The term "actuates," "actuation," and likewise, as used herein, refers to the deformation of the safety switch from the unactuated configuration to the actuated configuration.

Each of the layers 302a-302e of the safety switch 302 may have a respective thickness, and the safety switch 302 may be defined by relative thickness ratios among the layers. In some embodiments, for example, each of the layers 302a-302e may have a respective thickness enabling the safety switch 302 to reach a specified initial length and final length corresponding to temperatures and/or Martensitic/Austenite phases, as described above. In other embodiments, the thickness of each of the layers 302a-302e may be selected, respectively, to optimize the performance of one or more of the layers 302a-302e and/or the safety switch 302, such as optimizing safety (e.g., minimizing failure risk), battery life, and likewise. For example, the layers may be selected in the following order: electrically conductive layers 302a and 302e (optional), silicon single crystal layer 302c, and crystalline and amorphous SMA layers 302b and 302d. For example, the thickness of the crystalline SMA layer 302b may be less than or equal to 10 mm. In some embodiments, the thickness ratio between the crystalline SMA layer 302b and the amorphous SMA layer 302d may be 1.0 (or a number substantially equal to one, such as 0.99). The crystalline SMA layer 302b and the amorphous SMA layer 302d having substantially equal thicknesses may maximize the effect of eliminating hysteresis in the safety switch 302. However, in some embodiments, the thickness of the crystalline SMA layer 302b may be substantially different from the thickness of the amorphous SMA layer 302d depending on the desired response of the safety switch 302. Further, the thickness ratio of the silicon single crystal layer 302c over the crystalline SMA layer 302b and/or the amorphous SMA layer 302d may be 700 (or any value which allows phase transformation in the crystalline SMA layer 302b). The bend distance of the safety switch 302 may be inversely related to the thickness of the silicon single crystal layer 302c. However, if, for example, the thickness ratio is higher than 700, atomic rearrangement for phase transformation in the crystalline SMA layer 302b may not occur due to the interfacial stress at the interface between crystalline SMA layer 302b and the silicon single crystal layer 302c. It should be understood that FIGS. 3A and 3B are schematic diagrams intended to illustrate the position of the safety switch 302 relative to the other components of the LIB 300 and the layers. The physical actuation of the safety switch 302 is shown in further detail in FIGS. 3C and 3D, described below.

With regard to FIGS. 3C and 3D, illustrations of the actuation of the safety switch 302 are shown, according to some embodiments. As shown in FIG. 3C, the safety switch 302 may be positioned on or within LIB cell 300 in an "ON" state. Further, the safety switch 302 may be positioned between a first electrical interface 304 (e.g., positive terminal 305) and a second electrical interface 306 (e.g., the positive tab 307) and be in an "ON" state such that the safety switch 302 allows electrical current to flow between the positive terminal 305 and positive tab 307 through the safety switch 302. As discussed above, in some embodiments, the safety switch 302 may include a shape memory alloy (SMA) actuator 308 including one or more of the layers 302a-302e 302e (e.g., crystalline SMA layer 302b, amorphous SMA layer 302d, etc., as described regarding FIGS. 3A and 3B) and an electrode 310 that contacts the SMA actuator 308 when the SMA actuator 308 is not actuated. For example, the electrode 310 may be an electrical interface electrically connected to the positive tab 307 and physically engaged with (e.g., touching) the SMA actuator 308. The safety switch 302 may remain in the "ON" state (e.g., the unactuated configuration) illustrated in FIG. 3C while being exposed to a temperature associated with the Martensitic phase of one or more SMA layers of the safety switch 302. For example, the SMA actuator 308 may physically engage the electrode 310 and allow electrical current to flow between the positive terminal 205 and positive tab 307 while in the "ON" state.

As shown in FIG. 3D, the safety switch 302 may be in an "OFF" state (e.g., in an actuated configuration). For example, in response to the safety switch 302 being exposed to an increase in temperature (e.g., a temperature associated with the Austenite phase of one or more SMA layers of the safety switch 302), the safety switch 302 may transition to an "OFF" state such that the electrical connection between the first electrical interface (e.g., positive terminal 305) and second electrical interface (e.g., positive tab 307) is severed. For example, the SMA actuator 308 may bend at an angle θ relative to a horizontal axis (e.g., an axis on a plane of connection between the SMA actuator 308 and electrode 310 while the safety switch 302 is in the "ON" state) in response to an increase in temperature associated with a thermal runaway event. Further, the SMA actuator 308 may bend to an "OFF" state by bending such that the SMA actuator 308 breaks physical contact and the electrical connection with the electrode 310, thus disabling/preventing electrical current from flowing between the positive terminal 305 and positive tab 307 through the safety switch 302. The SMA actuator 308 may bend as shown in FIG. 3D due to one or more layers of the SMA actuator 308 (e.g., crystalline SMA layer 302b) increasing in length and exerting force on one or more additional layers of the SMA actuator 308 (e.g., amorphous SMA layer 302d) that do not undergo a substantial increase in length in response to a temperature increase (e.g., layers that do not phase transform between Martensitic and Austenite phases). Depending on the battery, thermal runaway in LIBs may occur at temperatures of about 200° C. The SMA actuator 308 may be configured (e.g., based on the composition of the SMA actuator 308) to bend to the "OFF" state at a temperature lower than 200° C. (e.g., 10° C. lower, 20° C. lower, 30° C. lower, 40° C. lower, 50° C. lower, 60° C., more than 60° C. lower, etc.) before thermal runaway can occur. In other LIBs, thermal runaway may be expected at different temperatures (e.g., 150° C., 160° C., 170° C., 180° C., 190° C., 210° C., 220° C., 230° C., 240° C., 250° C.), and the SMA actuator 308 may be configured to bend to the "OFF" state at a temperature lower than the expected thermal runaway temperature of the LIB. In some embodiments, the temperature at which the SMA actuator 308 is configured to bend to the "OFF" state may be any temperature between the upper limit of the normal operating range of the LIB and the thermal runaway temperature. For example, a LIB may have a normal operating range of 10° C. to 60° C. and an expected thermal runaway temperature of 200° C. The SMA actuator 308 may be configured to bend to the "OFF" state at any temperature greater than 60° C. and less than 200° C.

Figure 4A:
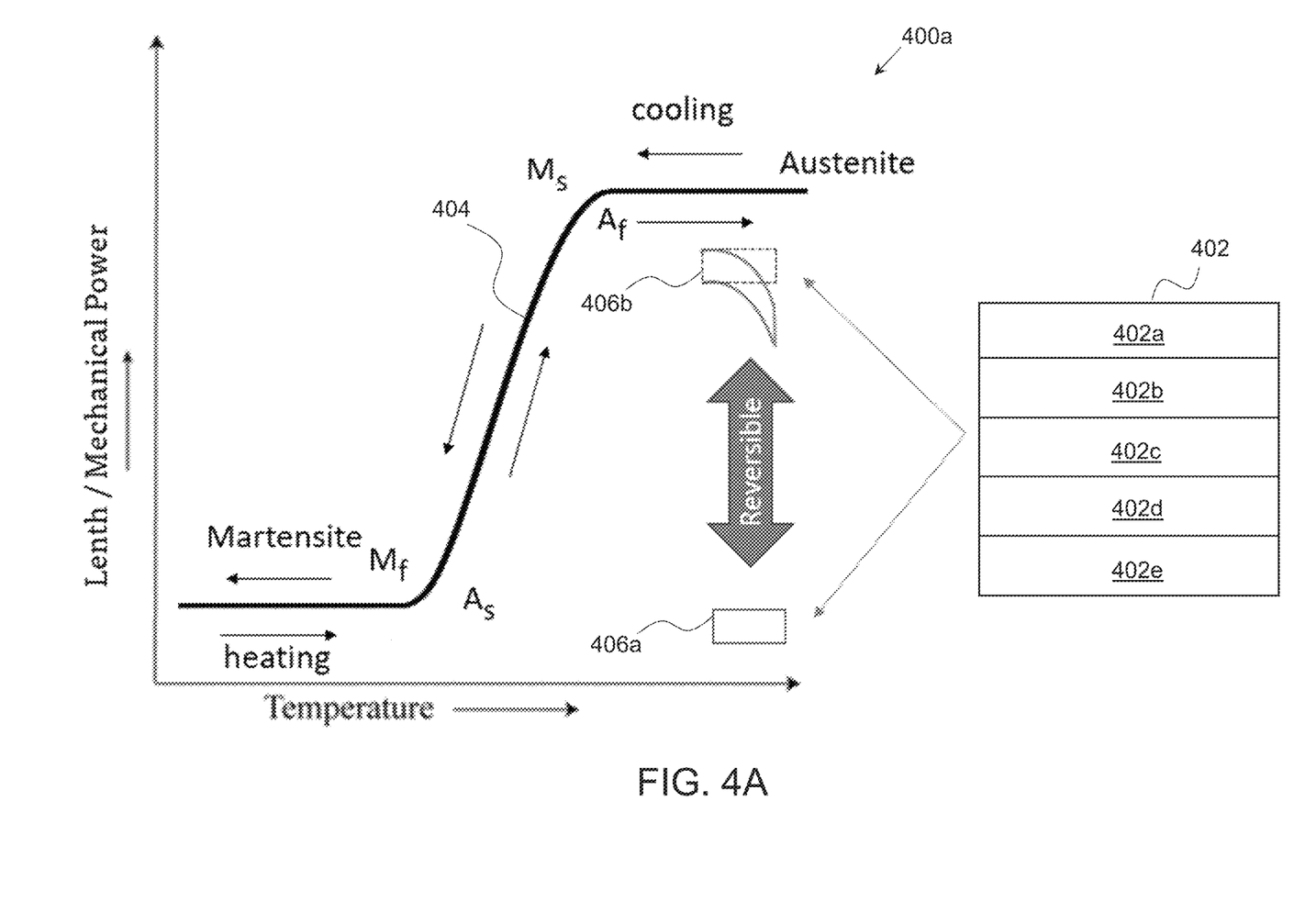
FIGS. 4A and 4B illustrate the change in length/mechanical power at a given temperature for safety switches, according to an embodiment.
Figure 4B:
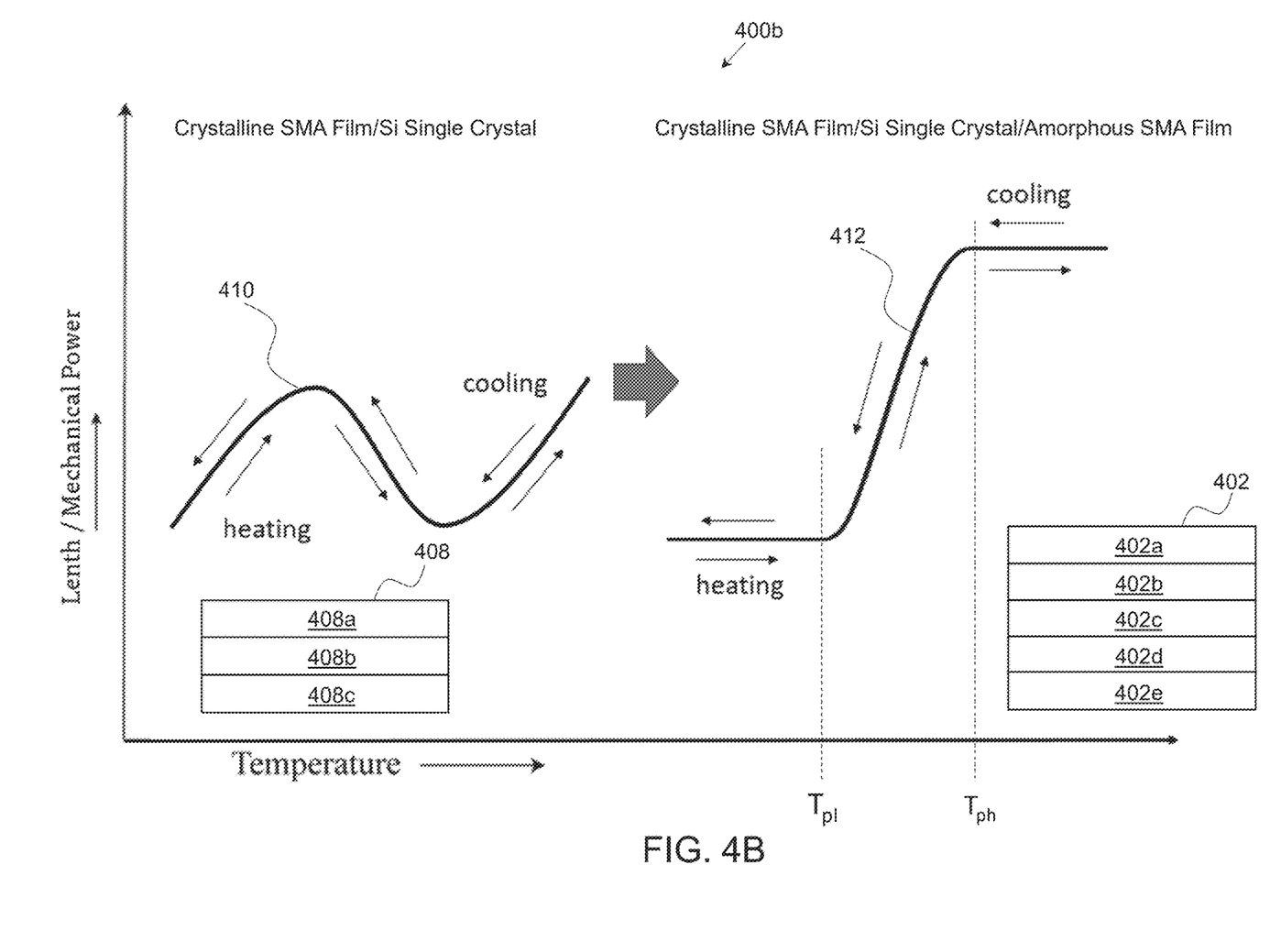

With regard to FIGS. 4A and 4B, illustrative plots 400a-400b showing the change in length/mechanical power of safety switches 402, and 408 at given temperatures are shown, according to an embodiment. As shown in FIG. 4A, the safety switch 402 (or shape memory alloy assembly, SMA assembly, etc.) may include a series of layers 402a-402e. As described above regarding safety switch 302 of FIG. 3, the layers 402a-402e of the safety switch 402 may include: a first electrically conductive layer 402a, a crystalline shape memory alloy (SMA) layer 402b, a silicon single crystal layer 402c, an amorphous shape memory alloy (SMA) layer 402d, and a second electrically conductive layer 402e. In some embodiments, the layers 402a-402e may be included in the order listed above.

As shown in FIG. 4A, the plot 400a may represent the relationship between the length/mechanical power of the safety switch 402 and the operating temperature (e.g., a temperature of a LIB) and be illustrated as line 404 of the plot 400a. Note that the terms "length/mechanical power" and the like, as used herein, refer to a relationship between a physical length of the safety switch 402 and mechanical power stored by the safety switch 402 where, in response to a phase change associated with an increase in temperature, the stored mechanical power increases and is further released, causing the safety switch 402 to extend or elongate (e.g., increasing length, etc. of the safety switch 402). The operating temperature range may be defined by one or more phases (or states), and the layers 402a-402e may behave differently depending on the material of the layers 402a-402e and the operating temperature/phase/state. For example, the safety switch 402 (via the crystalline SMA layer 402b) may exist in a Martensitic phase, an Austenite phase, or a mixed (or transition) phase depending on the temperature. In some embodiments, the temperatures corresponding to a phase change (e.g., "activation" temperatures causing the safety switch 402 to actuate, which may or may not be associated with Martensitic and/or Austenite phase (s)) may be defined by including (or determined based on the) specific materials or combinations of materials (e.g., 50% Ni and 50% Ti alloy) within the safety switch 402 and/or one or more of the layers 402a-402e (e.g., crystalline SMA layer 402b and/or amorphous SMA layer 402d). In some embodiments, the respective composition and/or the relative thickness of the layers 402a-402e may be selected to define the activation temperatures of the safety switch 402. In other embodiments, the respective thickness of each of the layers 402a-402e and/or the respective thickness ratio among layers may define the actuation distance (e.g., first length associated with low-temperature/Martensitic phase, second length associated with high-temperature/Austenite phase, etc.).

During an initial heating phase, for example, the safety switch 402 (e.g., crystalline SMA layer 402b) may have an initial (or unactuated) length. This initial heating phase may be a low-temperature phase (e.g., Martensitic phase) during which the safety switch 402 and/or crystalline SMA layer 402b are malleable (e.g., having a crystal structure capable of deformation under minimal stress). During the Martensitic phase, the safety switch 402 and/or crystalline SMA layer 402b may deform non-permanently (e.g., may be capable of returning to an initial shape exhibited before deformation). For example, the safety switch 402 and/or crystalline SMA layer 402b may exhibit a first length during the Martensitic phase, increase its mechanical power/length (e.g., actuate) to a second length in response to transitioning from the Martensitic phase to a higher temperature phase, and then reversibly actuate/return to the first length in response to transiting back into the Martensitic phase when the temperature decreases. The safety switch 402 and/or crystalline SMA layer may then actuate again to the second length in response to a second temperature increase, and the process may continue indefinitely (e.g., reversibly) by the safety switch 402 transitioning between unactuated ("ON") and actuated ("OFF") states. Further, the safety switch 402 and/or crystalline SMA layer 402b may store mechanical energy/power (e.g., during the Martensitic phase) and release this mechanical energy/power as actuation force to adjust physical dimensions (e.g., length) of the safety switch 402 and/or crystalline SMA layer 402b. The Martensitic phase may be defined as a range of temperatures (e.g., a start temperature $M_s$ and a finish temperature $M_f$) within which the safety switch 402 and/or crystalline SMA layer 402b may exhibit properties as described above.

As the operating temperature increases beyond the finish temperature $M_f$ defined by the Martensitic phase, the safety switch 402 and/or crystalline SMA layer 402b may exist in a transition phase before entering the Austenite phase. During the transition phase, the temperature of the safety switch 402 and/or crystalline SMA layer 402b may be a temperature above the temperature range defined by the Martensitic phase but below a temperature range (e.g., a start temperature $A_s$ and a finish temperature $A_f$) defined by the Austenite phase. Further, the materials of the safety switch 402 (e.g., crystalline SMA layer 402b) may exist in a mixed state during the transition phase and contain both martensite and austenite structures.

As the operating temperature increases to the start temperature $A_s$ of the Austenite phase, the stored energy of the safety switch 402 and/or crystalline SMA layer 402b may increase, causing the safety switch 402 and/or crystalline SMA layer 402b to elongate (e.g., increase in length, actuate, etc.). For example, the safety switch 402 and/or crystalline SMA layer 402b may increase (e.g., actuate) from a first length defined by the Martensitic phase to a second length defined by the Austenite phase. In some embodiments, the second length may be longer than the first length. Further, the first length of the safety switch 402 and/or crystalline SMA layer 402b may enable electrical current to flow through the LIB (e.g., the safety switch 402 being in an "ON" state characterized by the safety switch 402 maintaining a physical connection between one or more electrical interfaces and allowing a complete circuit to be formed within the LIB), and the second length may prevent electrical current from flowing through the LIB (e.g., the safety switch 402 being in an "OFF" state characterized by the safety switch 402 disconnecting from the one or more electrical interfaces and stopping electrical current flow).

The phase transformation temperatures (e.g., $M_a$, $M_s$, $A_s$, and $A_f$) may be defined by the composition of the safety switch 402 (e.g., the composition of the crystalline SMA layer 402b and/or the amorphous SMA layer 402d). For example, the phase transformation temperatures may be defined by the relative composition of Nickel and Titanium in one or more of the safety switch 402, crystalline SMA layer 402b, and/or amorphous SMA layer 402d. In some embodiments, the activation temperature associated with the Martensitic and/or Austenite phase(s) may be predefined by selecting certain materials, combinations of materials, layers, and/or combinations of layers to include in the safety switch 402. Further, the safety switch 402 and/or crystalline SMA layer 402b may store mechanical energy/power (e.g., during the Martensitic and/or transition phase(s)) and release this mechanical energy/power as actuation force to adjust physical dimensions (e.g., length) of the safety switch 402 and/or crystalline SMA layer 402b (e.g., in response to transitioning to a temperature associated with the Austenite and/or transition phase(s)).

As shown in FIG. 4A, the safety switch 402 may be in an "ON" state 406a during the Martensitic phase (e.g., a time period during which operating temperatures fall within $M_s$ and $M_f$). While in the "ON" state 406a, the safety switch 402 may include physical dimensions enabling electrical current to flow through the LIB via the safety switch 402. For example, the safety switch 402 may be configured to make contact with one or more electrical interface(s) of the LIB while in the "ON" state 406a. For example, the safety switch 402 may be configured to make contact with both the first and second electrical interfaces described with reference to FIG. 3). Additionally, the safety switch 402 may be in an "OFF" state 406b during the Austenite phase (e.g., a time period during which operating temperatures fall within $A_s$ and $A_f$). While in the "OFF" state 406b, the safety switch 402 may include physical dimensions distinct from the physical dimensions exhibited by the safety switch 402 during the Martensitic phase (e.g., state 406a) and may be configured to disconnect from (or avoid contact with) one or more electrical interface(s) of the LIB during the Austenite phase (e.g., state 406b). For example, the safety switch 402 and/or crystalline SMA layer 408b may elongate such that the safety switch 402 disconnects from the electrical interface of the LIB while in the "OFF" state 406b, as shown.

Note that FIG. 4A shows the safety switch 402 being in an "ON" state associated with the Martensitic phase (e.g., connecting to electrical interface(s) and providing power to the LIB) and an "OFF" state associated with the Austenite phase (e.g., disconnecting from electrical interface(s) and disabling power to the LIB). In other embodiments, the safety switch 402 may be in an "OFF" state while in the Martensitic phase and in an "ON" state while in the Austenite phase. For example, the safety switch 402 and/or the crystalline SMA layer 408b may be configured to disconnect from electrical interface(s) while in the Martensitic phase (e.g., via shortening to physically sever an electrical connection) and connect to electrical interface(s) while in the Austenite phase (e.g., by lengthening to make physical contact with electrical interface(s)), or otherwise. For example, in some embodiments, the safety switch 402 can be configured to prevent electrical current from flowing in the LIB in response to the LIB being exposed to extreme cold (e.g., via a decrease in an operating temperature of the LIB) by engaging one or more electrical interfaces of the LIB during an initial state associated with a higher temperature (e.g., by the safety switch 402 being a first length while being in the Austenite phase) and further disconnecting from the one or more electrical interfaces in response to a decrease in temperature (e.g., to a temperature below a minimum safe operating temperature of the LIB).

As shown in FIG. 4B, the plot 400b may represent the relationship between the length/mechanical power of the safety switches 402 and 408 and the operating temperature (e.g., a temperature of the safety switches 402 and 408). Further, lines 410-412 may illustrate the thermo-mechanical response of the safety switches 402 and 408, respectively, when the safety switches 402 and 408 are exposed to different temperatures (e.g., "heating" and "cooling" phases, Martensitic and Austenite phases, etc.).

As shown in FIG. 4B, the safety switch 408 includes multiple layers 408a-408c. In some embodiments, the layers 408a-408c of the safety switch 408 include: an electrically conductive layer 408a, a crystalline SMA layer 408b, and a silicon single-crystal layer 408c but do not include an amorphous SMA layer. By including only a single SMA layer (e.g., crystalline SMA layer 408b), the safety switch 402 may experience stress in response to temperature changes (e.g., in response to changes in temperature from the Martensite to Austenite phases, and vice versa). For example, thermal stress may be generated due to thermal expansion differences between the crystalline SMA layer 408b and the silicon single-crystal layer 408c. Further, phase transformation stress may be generated due to the phase changes (e.g., Martensitic to Austenite, and vice versa) of the layers 408a-408c of the safety switch 408.

As shown in line 410, thermal and/or mechanical stress may affect the response (e.g., actuation) of the safety switch 408 and/or the crystalline SMA layer 412. For example, thermal and/or mechanical stress may affect the actuation of the safety switch 408 and/or the crystalline SMA layer 412 by introducing hysteresis, which can cause a lag in the actuation response of the safety switch 408/crystalline SMA layer 412 across different temperature points. The lag caused by hysteresis can prevent the switch from actuating at the same activation temperatures during heating and cooling cycles, leading to potential variability in the "ON" to "OFF" transition (and vice versa) of the safety switch 408 that is not strictly aligned with the pure Martensitic or Austenite phases of the crystalline SMA layer 412. Furthermore, because the operational state of the safety switch 408 (e.g., "ON" or "OFF") can be influenced by the length of the switch and/or the crystalline SMA layer 408b, the hysteresis introduced by thermal and/or mechanical stress can affect the safety switch's precision in preventing overheating or thermal runaway in a LIB cell or module. For example, in response to hysteresis caused by repeated heating/cooling of the crystalline SMA layer 412, the safety switch 402 may prematurely activate to an "OFF" state during a temperature transition phase, rather than precisely within the Austenite phase. Moreover, hysteresis can lead to non-repeatable actuation lengths. For example, after moving from a first length to a second length, hysteresis may prevent the safety switch 408 from returning to the exact first length upon reversing the actuation (e.g., in response to a decrease in temperature to within a range of temperatures associated with the Martensitic phase), potentially achieving a length similar to, but distinct from, the original length of the safety switch 402 (e.g., returning to 90% of the first length).

However, as shown in line 412, the response of the safety switch 402 may be different from the response of the safety switch 408 due to additional layers included in safety switch 402. Recall that both of the safety switches 402 and 408 may include an electrically conductive layer (402a and 408a), a crystalline SMA layer (402b and 408b), and a silicon single-crystal layer (402c and 408c). As described above, safety switch 402 may further include an amorphous SMA layer 402d and a second electrically conductive layer 402e. As shown, including the amorphous SMA layer 402d may cause the safety switch (via the crystalline SMA layer 402b) to actuate at respective lengths that are repeatable (e.g., the safety switch 402 may return to a first length in response to a temperature change after actuating to a second length from the first length, avoiding a lag in activation temperatures caused by hysteresis, etc.). As such, the safety switch 402 may actuate reversibly such that the safety switch 402 may transition to "ON" and/or "OFF" states that are substantially identical over time (e.g., the safety switch may actuate to a first length corresponding to the "ON" state, then actuate to a second length corresponding to the "OFF" state, then transition back to the first length corresponding to the "ON" state, etc.).

As discussed above, the increase in temperature may cause both phase transformation stress and thermal stress. Phase transformation stress is associated with the phase transformation of the crystalline SMA layer 402b from the Martensitic phase to the Austenite phase. Thermal stress is associated with the difference in thermal expansion between the crystalline SMA layer 402b and the silicon single crystal layer 402c. The hysteresis in the safety switch 408 without an amorphous SMA layer 402d may be due in part to this thermal stress. Because the amorphous SMA layer 402d has substantially the same thermal expansion coefficient as the crystalline SMA layer 402b, the thermal stress may be substantially eliminated, which may substantially eliminate hysteresis, which may enable repeated use of the safety switch 402 (e.g., multiple "ON" /"OFF" cycles). However, because the amorphous SMA layer 402d does not undergo a phase change, the amorphous SMA layer 402d may not interfere with the bending of the safety switch 402 associated with the phase transformation of the crystalline SMA layer 402b.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

The terms "coupled," and the like as used herein mean the joining of two members directly or indirectly to one another except where context clearly implies that two members are directly coupled. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

While this specification contains many specific implementation details, these should not be construed as limitations on the scope of any embodiments or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Thus, particular implementations of the disclosure have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed:

1. A battery system for a lithium-ion battery (LIB) cell, the battery system comprising:
    a first electrical interface;
    a safety switch connected to the first electrical interface, the safety switch including:
        a shape memory alloy element configured to reversibly transition between an unactuated configuration and an actuated configuration in response to a change in temperature of the LIB cell, wherein the shape memory alloy element transitions to the actuated configuration in response to reaching an activation temperature, and wherein the shape memory alloy element returns to the unactuated configuration in response to cooling below a threshold temperature;
a first electrically conductive layer positioned adjacent to and uniformly covering substantially all of a first surface of the shape memory alloy element; and
a second electrically conductive layer positioned adjacent to and uniformly covering substantially all of a second surface of the shape memory alloy element; and
a second electrical interface connected to the safety switch, wherein the connection between the first electrical interface, the safety switch, and the second electrical interface enables electrical current to flow through the LIB cell;
wherein when the shape memory alloy element is in the unactuated configuration, the safety switch directly engages the first electrical interface and the second electrical interface and enables electrical current to flow through the LIB cell;
wherein when the shape memory alloy element is in the actuated configuration, the safety switch disconnects from at least one of the first electrical interface and the second electrical interface and disables electrical current from flowing through the LIB cell; and
wherein the shape memory alloy element comprises a crystalline shape memory alloy layer and an amorphous shape memory alloy layer, the amorphous shape memory alloy layer configured to reduce stress associated with a reversible phase change of the crystalline shape memory alloy layer.

2. The battery system of claim 1, wherein the shape memory alloy element is configured to reversibly transition between a first length associated with the unactuated configuration and a second length associated with the actuated configuration in response to the change in temperature of the LIB cell.

3. The battery system of claim 1, wherein actuation of the shape memory alloy element causes the safety switch to actuate reversibly between an "ON" state and an "OFF" state, and wherein the shape memory alloy element allows the flow of electricity in the LIB cell while in the "ON" state and disables the flow of electricity in the LIB cell while in the "OFF" state.

4. The battery system of claim 1, wherein a dimension of the crystalline shape memory alloy layer and a dimension of the amorphous shape memory alloy layer are substantially identical.

5. The battery system of claim 4, wherein the crystalline shape memory alloy layer comprises an alloy of Nickel (Ni) and Titanium (Ti).

6. The battery system of claim 4, wherein the crystalline shape memory alloy layer is configured to transition from a Martensitic phase in the unactuated configuration to an Austenite phase in the actuated configuration.

7. The battery system of claim 1, wherein a thickness of the crystalline shape memory alloy layer and a thickness of the amorphous shape memory alloy layer are substantially identical.

8. The battery system of claim 7, wherein the amorphous shape memory alloy layer is an alloy having a composition of 50% Ni and 50% Ti.

9. The battery system of claim 1, wherein the safety switch further comprises a silicon single crystal layer.

10. The battery system of claim 1, wherein the first electrical interface is a positive terminal of the LIB cell and the second electrical interface is a positive tab of the LIB cell, or wherein the first electrical interface is a negative terminal of the LIB cell and the second electrical interface is a negative tab of the LIB cell.

11. The battery system of claim 1, wherein the first electrical interface is an electrode tab electrically connecting the LIB cell to one or more LIB cells, and wherein the second electrical interface is a positive terminal or a negative terminal of the LIB cell.

12. The battery system of claim 1, wherein the shape memory alloy element further comprises:
a silicon single crystal layer.

13. The battery system of claim 12, wherein the first electrically conductive layer, the crystalline shape memory alloy layer, the silicon single crystal layer, the amorphous shape memory alloy layer, and the second electrically conductive layer are stacked in order or reverse order.

14. The battery system of claim 13, wherein a first side of the first electrically conductive layer is coupled to a first side of the crystalline shape memory alloy layer, wherein a second side of the crystalline shape memory alloy layer is coupled to a first side of the silicon single crystal layer, wherein a second side of the silicon single crystal layer is coupled to a first side of the amorphous shape memory alloy layer, and wherein a second side of the amorphous shape memory alloy layer is coupled to a first side of the second electrically conductive layer.

15. The battery system of claim 12, wherein a composition and one or more physical dimensions of the amorphous shape memory alloy layer are selected to reduce stress associated with a phase change of the crystalline shape memory alloy layer.

16. The battery system of claim 12, wherein a first side of the crystalline shape memory alloy layer is coupled to a first side of the silicon single crystal layer, and wherein a second side of the silicon single crystal layer is coupled to a first side of the amorphous shape memory alloy layer.

17. The battery system of claim 1, wherein the shape memory alloy element comprises at least three layers.

18. The battery system of claim 17, wherein the safety switch further comprises the first electrically conductive layer coupled to a first side of the shape memory alloy element, and the second electrically conductive layer coupled to a second side of the shape memory alloy element.

19. The battery system of claim 18,
wherein the first electrically conductive layer of the safety switch is electrically connected to the first electrical interface, and
wherein the second electrically conductive layer of the safety switch is electrically connected to the second electrical interface, and wherein actuation of the shape memory alloy element causes at least one of the first electrical interface or the second electrical interface to disconnect from the safety switch.

20. The battery system of claim 19, wherein a first temperature of the safety switch is associated with the actuated configuration, wherein the actuated configuration associated with the first temperature is unique to the first temperature, and wherein the safety switch is configured to be in the actuated configuration only when the safety switch is at the first temperature; and
wherein a second temperature of the safety switch is associated with the unactuated configuration, wherein the unactuated configuration associated with the second temperature is unique to the second temperature, and wherein the safety switch is configured to be in the unactuated configuration only when the safety switch is at the second temperature.

* * * * *